United States Patent Office 3,733,394
Patented May 15, 1973

3,733,394
PROCESS FOR MAKING CHAOITE
Arthur G. Whittaker, Woodland Hills, Calif., assignor to The Aerospace Corporation, Los Angeles, Calif.
No Drawing. Filed Aug. 3, 1970, Ser. No. 60,705
Int. Cl. C01b *31/02*
U.S. Cl. 423—460  4 Claims

ABSTRACT OF THE DISCLOSURE

An allotropic form of carbon, "chaoite," having a white appearance, a hardness greater than 9 on the Moh scale, a density in excess of 3.33 g./c c., is produced on the surface of graphite heated to above 2550° K. in an inert atmosphere.

---

The invention herein described was made in the course of or under a contract with the Department of the Air Force.

BACKGROUND OF THE INVENTION

This invention relates to the allotrope of carbon known as "chaoite" and more particularly to a process synthetically producing chaoite through its conversion from graphite.

In 1968 it was first reported, Science, volume 161, pp. 363, 364 (July 26, 1968), that a new allotropic form of carbon had been discovered in shock-fused graphite gneisses in the Ries Crater, Bavaria. This allotrope was identified as a new mineral because of its distinctive optical characteristics appearing in polished sections of gneisses from that crater. It is a transparent, birefringent material having a white appearance as a result of light diffusion from large numbers of random small crystals. Electron probe analysis of samples from the crater shows they are pure carbon. Crystal diffraction patterns indicate a hexagonal unit cell configuration with dimensions $A_o$ and $C_o$ of $8.948 \pm 0.009$ and $14.078 \pm 0.017$ angstroms respectively. Added studies reported conclude the presence of 168 carbon atoms per cell and a calculated density of 3.43 grams/cc.

This new allotrope of carbon has been named "chaoite" and is sometimes otherwise referred to as "white carbon."

Prior to the present invention chaoite was known to exist only in trace amounts as a result of natural phenomena. There were no known or reported synthetic or reproducible processes for producing chaoite.

SUMMARY OF THE INVENTION

It has been discovered that when graphite is subjected to heating and its temperature raised to a temperature of approximately 2550° K. in a controlled inert atmosphere, the allotrope of carbon chaoite is synthetically produced on the surface of the graphite.

Accordingly it is the primary object of the present invention to provide a method of producing chaoite and to provide a practical application for this new mineral as synthetically produced.

It is a further object of this invention to include several alternate steps in the method of making chaoite so that such process can be practiced through the use of a selected application of various existing apparatus.

It is a still further object of the invention to provide a new synthetic material having such hardness as to have preferred uses in the field of abrasives, that is, buffing, polishing, and grinding. Additionally, as chaoite is pure carbon and has a density of approximately 95% of diamond, it offers potential as a precursor in the formation of synthetic diamonds.

DESCRIPTION OF THE INVENTION

In the present invention the basic stock or starting material is graphite preferably of reasonably high purity as found for example in A. T. J. grade. Rods or bars of graphite are isolated in a conventional pressure or vacuum vessel. The interior of the vessel is evacuated to assure the absence of substantially all gas content to preclude any undesirable graphite reaction in subsequent process steps. On the other hand, to avoid the possible inconvenience of chamber evacuation, the vessel can be flushed of air and filled to atmospheric or superatmospheric pressure with a gas inert in the presence of heated graphite. Argon, as an example, as well as the other inert gases, is suitable for this purpose. Inasmuch as it has been determined that vessel pressure is not critical in carrying out the invention users have the option of selecting the environment most adaptable to their desires. Chaoite has been produced in a vessel evacuated to $10^{-4}$ torr (about $10^{-7}$ atmospheres) and to the other extreme of a positive pressure of 7 atmospheres of argon. After chamber conditioning, the graphite therein is heated to a temperature range having a lower limit which has been established at approximately 2550° K. The process has been practiced by heating the graphite to as high as 3300° K.; however a definite upper temperature limit, if any, has not been determined. It has been observed that the rate of chaoite formation on the graphite surface varies slightly as a function of temperature but this rate is not of such magnitude to warrant the inherent difficulties in working at a higher than necessary temperature.

One presently applied method of elevating the graphite temperature is by electrical resistive heating. Electrical leads through the chamber wall are attached to spaced apart locations of the isolated graphite rod or bar. A low voltage, high current supply of power is applied to the graphite from an external supply. Within 15 to 20 seconds after attaining the requisite temperature the graphite surface will grow to a silvery white at regions of maximum temperature. The silver white coating consists of whisker-like formations each of which is about 0.5 micron in diameter and 5 to 10 microns in length. These formations are chaoite or white carbon.

Another method of heating the graphite that has been successfully practiced is by electron bombardment. In this process at a 2.5 kilowatt power level the graphite was heated to 3000° K. and chaoite was formed. A still further heating arrangement employed was a carbon dioxide laser having its output beam directed to the graphite surface.

After chaoite is formed on the surface of the graphite it is removed therefrom by scraping. In so removing chaoite invariably the scrapings include graphite flakes or powder. Certain inherent qualities of chaoite, which distinguish it from graphite, permits it ready separation. The density of chaoite (3.3 to 3.42 g./cc.) being greater than graphite (2.2 g./cc.) renders them separable by a floatation process. As an example, in methylene iodide, chaoite sinks while graphite floats. After stratification in the liquid, chaoite is recovered by filtration. It has also been discovered that chaoite, being substantially more oxidation resistant than graphite, can be recovered by oxidizing the graphite powder commingled with chaoite.

EXAMPLES

As examples of the invention, several bars of pyrolitic graphite (PG) with dimensions of 2 mm. x 3 mm. x 40 mm. were heated resistively to maximum temperatures from 2700 to 3000° K. in a 0.1-micro atmosphere of argon. After heating for 15–20 seconds, a silvery white coating of dendrite-like formations appeared on each rod in the region of maximum temperature. Examination of the several bars showed that the white coating (chaoite) did not form in any region at a temperature below approximately 2550° K.

An electron micro probe analysis for all elements from boron to uranium was made at several locations on the white coatings. In addition to carbon, silicon was the only foreign element detected. Silicon content varied from zero to 2.5% by weight and it was concluded it was an incidental impurity not affecting the formation of chaoite.

Electron diffraction patterns produced by an electron beam directed to the white coating showed that the white dendrites are crystals of hexagonal symmetry with cell dimensions $A_0$ and $C_0$ of 8.948±0.010 and 14.078±0.018 angstroms, respectively. The measurements are substantially the same as specified in the prior report on the Ries Crater findings and substantiate the identity of the natural and synthetic materials.

Flakes of the chaoite produced were observed to sink slowly in methylene iodide thus establishing the density of at least 3.33 grams/cc. The noted minimum density and cell configuration indicate a minimum cell content of 163 carbon atoms.

In another example of the invention, an 8 inch length of ATJ grade graphite tube (3/8 inch outside and 3/16 inch inside diameters) was resistively heated under a vacuum by the application of power level of 10 kilowatts at 9 volts. A graphite temperature of more than 2550° K. was attained and a white coating (chaoite) was produced as in the other examples.

In the foregoing, characteristics of chaoite or white carbon have been given and several processes for its formation are disclosed. Variations and modifications of these processes will occur to those working with the invention. As for example, sophistication of presently available apparatus for carrying out the process would enable continuous formation and removal of chaoite. Such would essentially require the incorporation of a mechanized scraper or chaoite remover with the vacuum (pressure) vessel.

The scope and extent of the present invention are defined in the appended claims.

I claim:

1. The process for producing carbon in its allotropic form chaoite including, heating graphite to an elevated temperature of at least 2550° K. in a carbon inert atmosphere, maintaining the graphite at said elevated temperature until chaoite forms as a white coating on the surface of the graphite, and removing and collecting the chaoite from the graphite surface.

2. The process as defined in claim 1 wherein the graphite is raised to the elevated temperature by electrical resistive heating.

3. The process as defined in claim 1 wherein the graphite is heated by applying laser radiation to the surface of the graphite.

4. The process as defined in claim 1 wherein the graphite is heated by the application thereto of radiant energy.

References Cited

UNITED STATES PATENTS

| | | | |
|---|---|---|---|
| 3,383,298 | 5/1968 | Wilson et al. | 23—209.1 X |
| 3,362,788 | 1/1968 | Lauer | 23—209.1 |
| 3,372,991 | 3/1968 | Avery | 23—209.3 |
| 3,424,428 | 1/1969 | Canon | 23—209.1 X |

OTHER REFERENCES

Whittaker et al. "Science," vol. 165, No. 3893, Aug. 8, 1969, pp. 589–591.

Goresy et al. "Science," vol. 161, No. 3839, July 26, 1968, pp. 363–364.

Chang, "Studies on Effects of Deposition Conditions and Heat Treatment on the Properties of Pyrolytic Carbon," March 1965, pp. 9 and 54.

Brown et al., "Industrial Carbon and Graphite," 1958, Society of Chemical Industry, p. 95.

EDWARD J. MEROS, Primary Examiner

U.S. Cl. X.R.

204—173; 423—445, 449